June 26, 1956  R. E. J. NORDQUIST  2,752,050
MACHINE FOR SLIDING ARTICLES INTO STACKED RELATION
Filed July 3, 1953  3 Sheets-Sheet 1
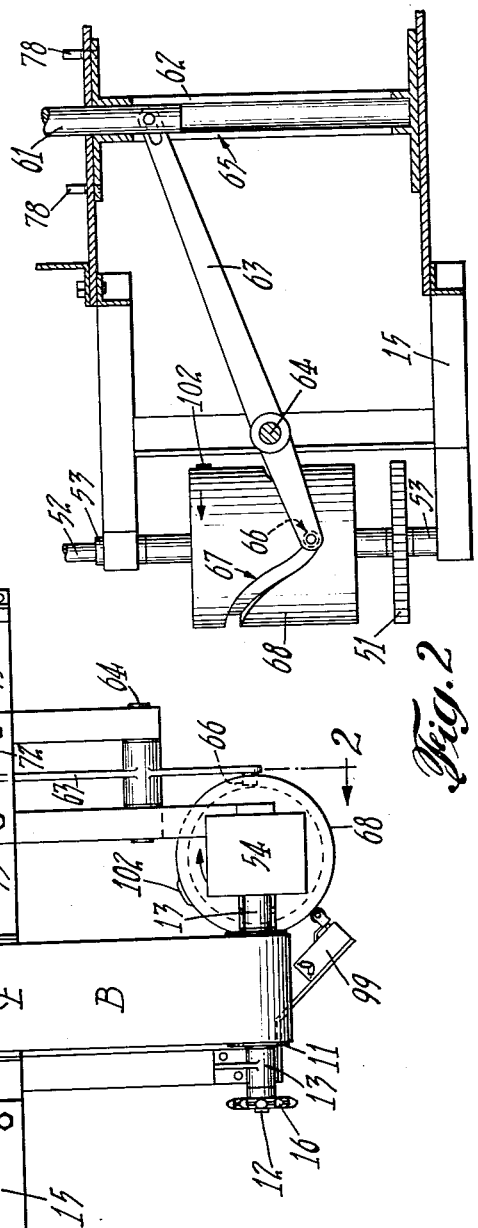
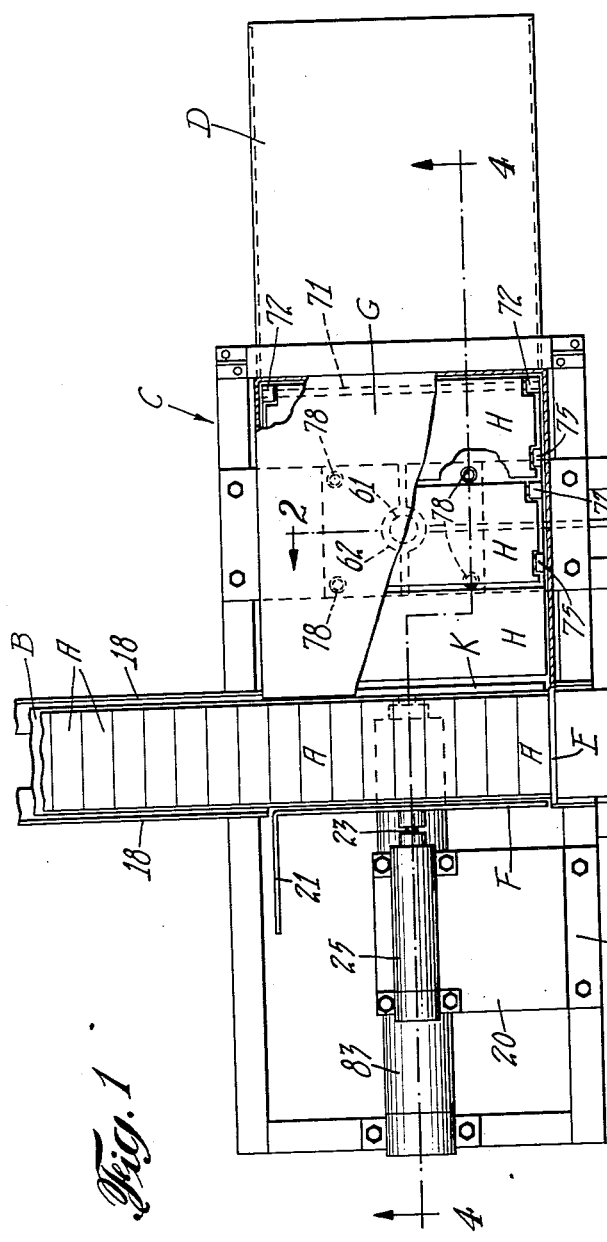
INVENTOR.
RONALD E. J. NORDQUIST
BY Charles H. Erne
Leland R. McCann
George W. Reiber
ATTORNEYS June 26, 1956 R. E. J. NORDQUIST 2,752,050
MACHINE FOR SLIDING ARTICLES INTO STACKED RELATION
Filed July 3, 1953 3 Sheets-Sheet 2
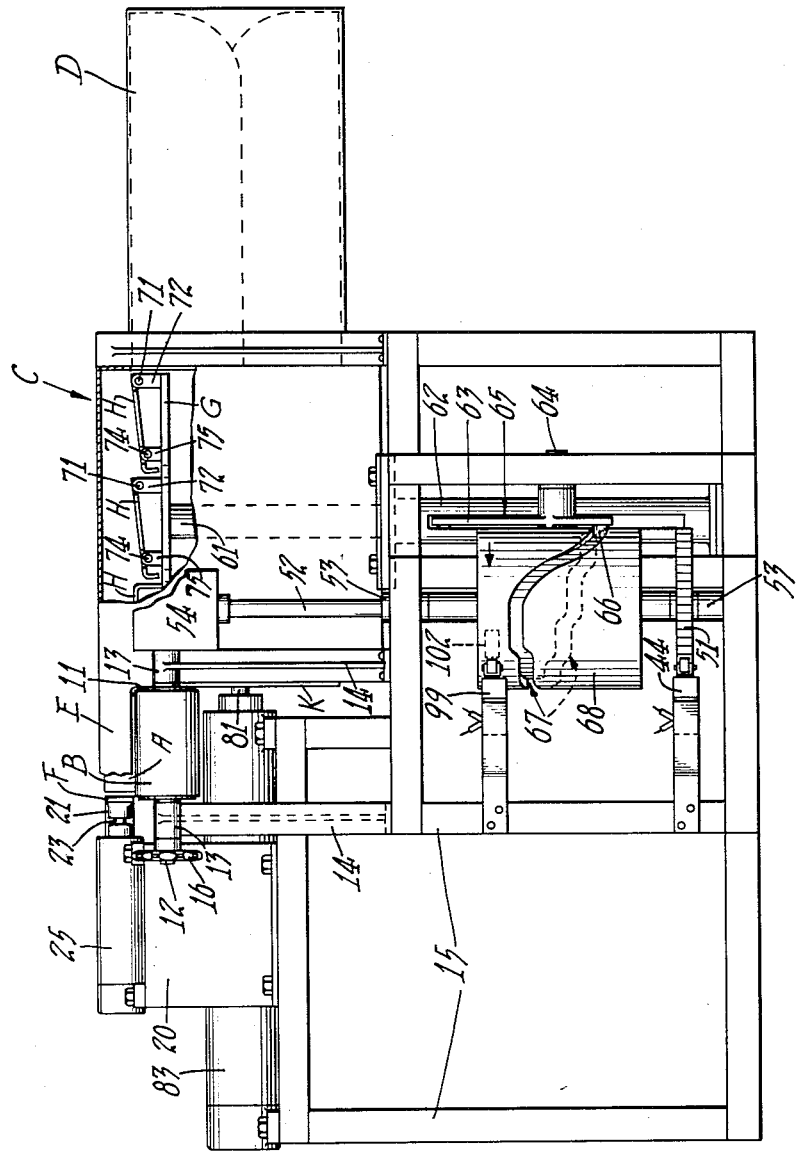
INVENTOR.
RONALD E. J. NORDQUIST
BY
ATTORNEYS

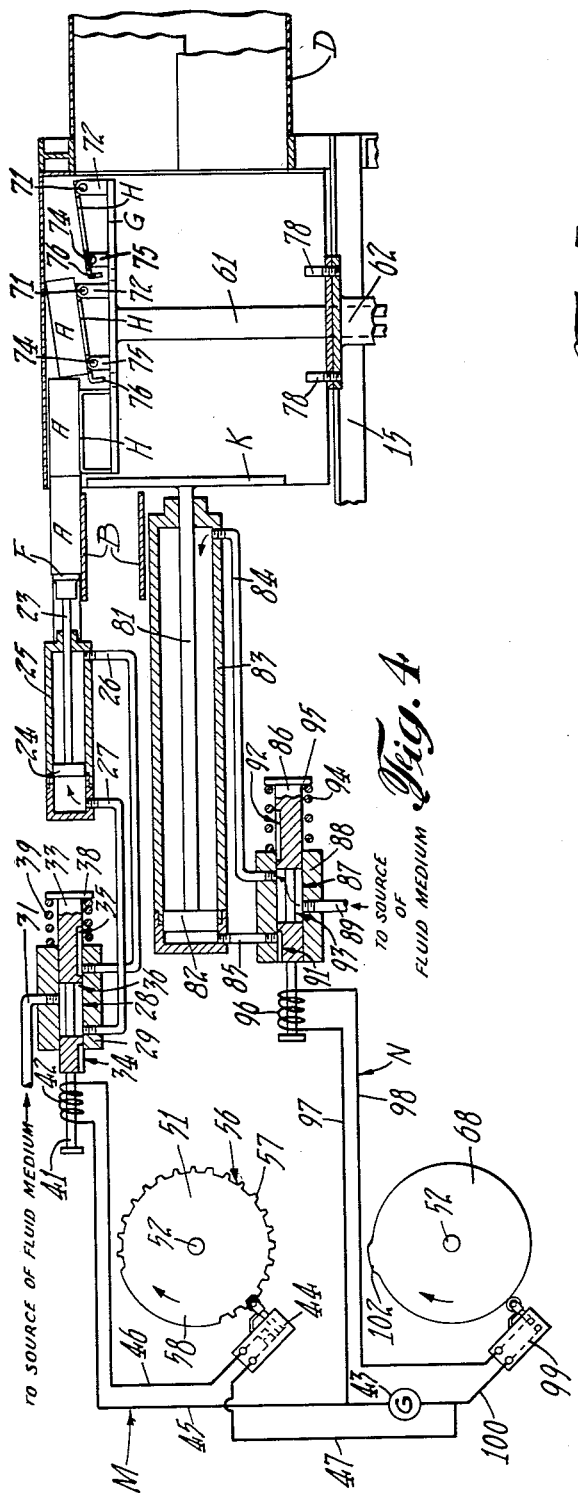
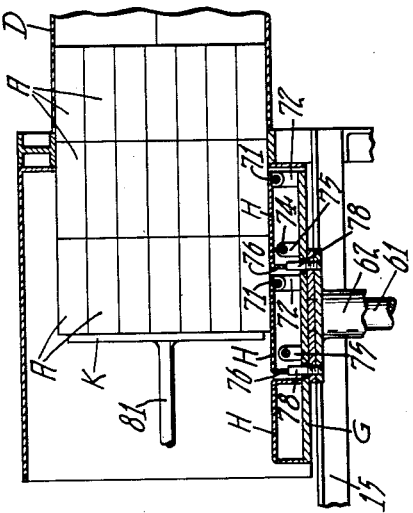
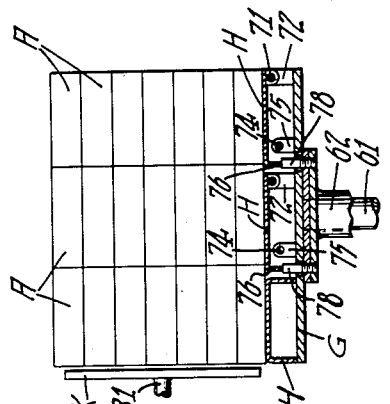
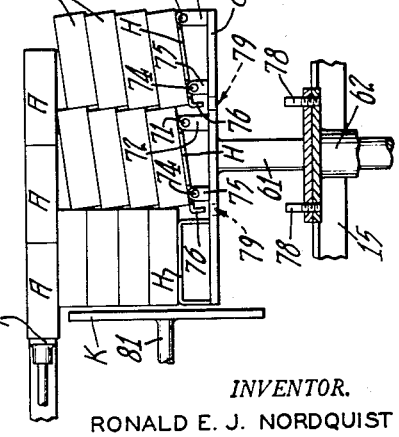
INVENTOR.
RONALD E. J. NORDQUIST

United States Patent Office 2,752,050
Patented June 26, 1956

2,752,050

MACHINE FOR SLIDING ARTICLES INTO STACKED RELATION

Ronald E. J. Nordquist, Maplewood, N. J., assignor to American Can Company, New York, N. Y., a corporation of New Jersey Application July 3, 1953, Serial No. 366,029

7 Claims. (Cl. 214—6)

The present invention relates to a machine for assembling articles in unit stacks for packaging and has particular reference to devices which facilitate sliding of unit layers of the articles into position over the tops of assembled layers of the article to build up a unit stack of such articles.

In the container making industry it is customary to ship finished empty containers in large paper bags or carriers to keep them in their original clean and attractive condition during transportation and storage until they are filled with a product. In order to facilitate packing of the empty containers into the carriers, the containers usually are assembled, by suitable machines, into orderly stacks of a plurality of layers and of proper dimensions to fit the carriers.

Since the containers are made individually and discharged in single file processional order they are usually first arranged in rows, and a plurality of rows assembled into a unit layer before the layer can be added to the stack. In some cases the stack is built up by pushing the containers row by row into place to produce unit layers arranged in stacked order. In such cases the unit rows of containers must slide over the tops of the containers in the previous layer. Where the containers have projecting portions such as flanges or end seams, a divider sheet is usually inserted between the unit layers to facilitate sliding of the containers into layer formation to prevent the sliding containers from damaging the assembled containers. However, the use of divider sheets is expensive and time consuming and requires additional machinery to insert the sheets.

The instant invention improves the handling of containers and has as its primary object the provision in an article stacking machine of devices which permit of the elimination of divider sheets and wherein the articles assembled to provide unit layers of the stack are supported in such a manner as to facilitate the sliding into proper position of the incoming articles over the assembled articles without interference or damage.

Numerous other objects and advantages of the invention will be apparent as it is better understood from the following description, which, taken in connection with the accompanying drawings, discloses a preferred embodiment thereof.

Referring to the drawings:

Figure 1 is a plan view of a stacking machine embodynig the instant invention, with parts broken away and parts shown in section;

Fig. 2 is a sectional view taken substantially along the line 2—2 in Fig. 1, with parts broken away;

Fig. 3 is a front elevation of the machine as viewed in Fig. 1, with parts broken away;

Fig. 4 is a schematic sectional view taken substantially along the broken line 4—4 in Fig. 1, with parts broken away and with a wiring diagram of the electrical. apparatus used in the machine; and Figs. 5, 6 and 7 are fragmentary sectional views of a portion of the machine showing certain of the moving parts in different positions and illustrating how articles are assembled to produce a compact stack for packaging.

As a preferred or exemplary embodiment of the instant invention the drawings illustrate principal parts of a stacking machine for arranging and stacking unit layers of articles A (Figs. 1, 4, 5, 6 and 7) such as the well known rectangular shaped fiber milk container, preparatory to placing them in paper bags or carriers for shipment and storage, although the invention is equally well adapted to round or other shaped containers and to sheet metal as well as fiber containers.

The containers A are received from any suitable source of supply, such as a container making machine, preferably in a horizontal position lying on their sides and moving in a substantially continuous straight line procession with the containers touching each other as best shown in Fig. 1. This procession of containers is supported on and is advanced on the upper run of a continuously moving horizontally disposed endless belt conveyor B (Figs. 1, 3 and 4) which extends across the machine. Adjacent the path of travel of the conveyor B, the machine is provided with a loading station C at which the containers from the conveyor are arranged in stacked formation for transfer into a paper bag or carrier D.

At the loading station C, the procession of containers A on the belt B is stopped by a stationary stop plate E (Figs. 1 and 3) which extends across the conveyor B. A pusher F located adjacent and movable across the conveyor, pushes a row of the containers off the belt onto a loading table or support G located adjacent the conveyor on the side opposite the pusher. Repeated operation of the pusher F places a plurality of rows of containers A on the loading support, each row as it is received pushing an advanced row ahead of it until sufficient rows of containers have been placed on the support to constitute a unit layer of containers.

The loading support G after receiving a full unit layer or tier of containers is lowered a distance substantially equal to the height or thickness of the layer, to locate the top level of the unit layer of containers substantially flush with the upper run of the conveyor B. The pusher then assembles a second layer of containers, row by row, on top of the first layer. This cycle of operation is repeated until the stack is completely built up to a height sufficient to fill a bag or carrier D.

In order to facilitate sliding of a row of containers, without interference, over the top of the containers of a previously assembled unit layer of containers, the support G carries a plurality of movable inclined platforms H on which the containers are supported. These platforms H extend across the path of travel of the rows of containers, with the low ends of the platforms adjacent the leading ends of containers advancing into position on the support, so that as a row of containers is pushed toward the inclined platforms, the leading ends of the containers in the row ride up onto and slide along the containers already on the platforms and thereby permits the containers to slide over each other without interference.

When a stack of containers is thus assembled, the platforms are raised into a horizontal position so that their supporting faces are aligned in a common plane to align the individual containers with each other. The entire stack of containers is then pushed off the support into a bag or carrier D by a reciprocable pusher K (Figs. 4, 5, 6 and 7) located adjacent the path of travel of the support G. This completes the cycle of operation of the machine.

Reference should now be had to the drawings in detail. The belt conveyor B that moves the procession of containers A into the machine, operates over a driving pulley 11 (Figs. 1 and 3) mounted on a continuously operated shaft 12 journaled in a pair of spaced bearings 13 formed on leg members 14 of a frame 15 which constitutes the main frame of the machine. The pulley shaft 12 is rotated in a suitable manner preferably through a sprocket 16 secured to the outer end of the shaft. A pair of spaced and parallel angle shaped guide rails 18 disposed adjacent the sides of the upper run of the conveyor B keeps the containers A on the conveyor in straight line formation.

The pusher F that extends along one edge of the upper run of the conveyor B for pushing the containers off the conveyor in rows of a predetermined number of containers, comprises a flat plate disposed in a vertical or on-edge position and extends from the container stop plate E along the conveyor for a distance equal to the length of the row of containers to be transferred to the stack. This pusher plate F at the end remote from the stop plate E, is formed with a right angle foot member 21 (Fig. 1) which holds back the procession of containers A when the pusher moves across the conveyor B to push a row of the containers onto the support G.

Movement of the pusher F across the conveyor B is effected preferably by fluid actuated devices. For this purpose the pusher F is secured to a piston rod 23 (Figs. 1, 3 and 4) having a piston 24 operable in a closed cylinder 25 attached to a bracket 20 mounted on the machine frame 15. Adjacent the ends of the cylinder 25 its interior communicates with a pair of inlet tubes 26, 27 which supply a fluid medium, preferably compressed air to the cylinder. These inlet tubes 26, 27 lead from and communicate with a bore 28 in a slide valve housing 29. Opposite and between the ends of the tubes 26, 27, the bore 28 communicates with a supply pipe 31 which leads from any suitable supply of compressed air.

Communication between the supply pipe 31 and the inlet pipes 26, 27 is controlled by a slide valve 33 which is disposed in the bore 28 with its ends extending beyond the slide valve housing 29. The slide valve 33 is formed with vent channels 34, 35 for alternately venting the inlet tubes 26, 27 to the outside atmosphere. Intermediate its ends the slide valve is formed with a groove 36 which in width is slightly less than the distance between the ends of the inlet tubes 26, 27.

At one end (at the right as viewed in Fig. 4) the slide valve 33 is provided with a head 38 and a compression spring 39 which surrounds the valve and which is located between the valve housing 29 and the valve head 38. The spring 39 yieldably holds the slide valve 33 in its normal position with the valve groove 36 maintaining communication between the air supply pipe 31 and the inlet tube 26 to admit air into the forward end of the cylinder 25 and thereby hold the piston 24 and pusher plate F in retracted positions as shown in Fig. 1.

The opposite end (at the left as viewed in Fig. 4) of the slide valve 33 is formed with a solenoid core 41 which is movable within a stationary electric solenoid 42 which is normally de-energized. This solenoid 42 is part of a slide valve actuating circuit M which receives electric current from a suitable source as a generator 43 and which also includes a normally open electric switch 44. The solenoid, the generator and the switch are connected in series by wires 45, 46, 47. The movable element of the switch 44 engages against the outer periphery of an edge cam 51 (see also Fig. 3) mounted on a vertical cam shaft 52 journaled in bearings 53 formed in the machine frame 15. The upper end of the cam shaft 52 connects with a speed reduction unit 54 of any suitable commercial design which connects with and is actuated by the conveyor pulley shaft 12 to rotate the cam shaft 52 at a slow speed in time with the conveyor B.

The edge cam 51 is formed with a plurality of short low portions 56 (Fig. 4) and intervening high portions 57 for repeated closing and opening of the electric switch 44 and is also provided with a long high portion 58 for holding the switch open for a considerable portion of the rotation of the cam. Repeated closing and opening of the switch 44 in time with the advancement of the conveyor B, alternately energizes and de-energizes the electric solenoid 42.

When the solenoid is energized, it shifts the slide valve 33 (toward the left as viewed in Fig. 4) into the position shown in Fig. 4 and thus cuts off communication between the air supply pipe 31 and the inlet tube 26 and establishes communication between the supply pipe 31 and the inlet pipe 27. This admits air into the back end of the cylinder 25. The air acts against the piston 24 and thus moves the pusher F which in turn shifts a row of containers A laterally from the conveyor B onto the support G.

Upon de-energization of the solenoid 42, the compression spring 39 returns the slide valve 33 to its normal position. This cuts off communication between the air supply pipe 31 and the inlet tube 27 and re-establishes communication between the supply pipe 31 and the inlet tube 26. Air is thus readmitted into the front end of the cylinder 25 and the piston 24 and the pusher plate F are returned to their normal positions for a repeat operation.

By way of example, the drawings illustrate each unit layer of containers A as being composed of three rows of containers, each row containing nine containers. Hence upon the completion of three repeated cycles of operation of the pusher F, three rows of containers have been assembled on the support G to produce an initial unit layer. The support G is a rectangular horizontal table of sufficient area to accommodate one layer. In order to assemble the remaining layers upon the initial layer to build up a stack, the support G is lowered the proper distance each time a layer is added so that the top of the newly completed layer is substantially flush or just slightly lower than the level of the upper run of the belt conveyor B so that shifting of the containers from the belt conveyor to the stack may be continued without interruption.

The lowering of the support G is effected preferably by cam action and while the pusher F is moving back through a return stroke after completing three layer assembling strokes. For this purpose, the table or support G is mounted on the upper end of a vertical rod 61 carried for vertical movement in a long upright sleeve bearing 62 (Fig. 2) secured in the machine frame 15. The rod 61 is lowered in time with the assembling of the unit layers of containers onto the support G and is raised to a starting position after a stack is formed and discharged from the support G, by a lever 63 which is mounted on a pivot pin 64 carried in the machine frame 15. One end of the lever 63 extends through a vertical slot 65 (see also Fig. 3) in the sleeve bearing 62 and projects into a recess in the lower end of the rod 61 and is attached to the rod by a pin and slot connection (see Fig. 2). The other end of the lever 63 carries a cam roller 66 which operates in a cam groove 67 formed in a barrel cam 68 mounted on and rotating with the continuously operating cam shaft 52. The cam groove 67 is formed with a plurality of successive steps, one for each unit layer of containers A in the stack to position the support G at the proper level for the reception of each layer.

In order to facilitate sliding of the containers over each other as they are assembled row by row onto previously assembled unit layers, the containers are received and supported on the platforms H hereinbefore mentioned as being carried on the table or support G. The invention is particularly directed to this feature. In the machine disclosed in the drawings there are three platforms H arranged in parallelism with each other and with the belt conveyor B. The platform immediately adjacent the conveyor B preferably is fixed on the support G in a horizontal stationary position relative to the support.

All of the platforms are of a width substantially equal to the length of the containers A.

The two platforms H immediately adjacent the fixed platform, preferably are movable, tilted or inclined platforms, each having its higher edge (at the right as viewed in Fig. 5) mounted on a pintle or pivot shaft 71 which extends the entire length of the platform (see Fig. 1). At their ends, the shafts 71 are carried in bearing lugs 72 which extend up from the support G. The platforms incline upwardly from the support G in a direction away from the belt conveyor B so that the low edges of the platforms are adjacent the leading ends of the containers A as they are pushed off the conveyor. The low edges of the platforms rest on support rails 74 secured in short lugs 75 which extend up from the support G. These low edges also terminate in depending skirts 76.

Hence the tilted platforms H provide a series of serrated steps (Figs. 4 and 5) which retain containers supported thereon in inclined positions so that when containers slide over a layer of previously stacked containers as shown in Fig. 5, the edges of the previously stacked containers that would interfere with advancement of newly added containers, are depressed below the path of travel of the advancing containers and are thereby in a non-interfering position. Thus rows of containers may be readily slid over layers of previously assembled containers without jamming or other interference.

In such an assemblage of a unit layer, a row of containers is first shifted from the belt conveyor onto the horizontal fixed platform adjacent the conveyor as shown in Fig. 4. The second row from the conveyor engages the first row and pushes the first row from the fixed platform onto the first inclined platform, while the second row remains on the fixed platform (Fig. 4). The third row engages the second row and advances all rows, leaving the first row on the second inclined platform, the second row on the first inclined platform, and the third row on the fixed platform. The unit layer is thus assembled and the support G is moved down a step to receive the next layer. When the stack is complete with its required number of layers, in this case seven layers as shown in the drawings, the support G moves down a distance sufficient to engage the skirt edges 76 of the inclined platforms with upright leveling pins 78 which are secured in the main frame 15 in the path of travel of the support G. Clearance holes 79 (Fig. 5) are provided in the support G to permit the tops of the leveling pins 78 to engage the skirt edges 76 of the platforms. This engagement raises the low edges of the platforms, as the support G moves down, until the platforms are in a horizontal position as shown in Fig. 6, the top faces of the platforms being in the same horizontal plane with the top face of the fixed platform. Further downward movement of the support G is then arrested. This is effected by the cam groove 67 in the barrel cam 68. The leveling action shifts all of the angularly disposed containers A into a level position and thus creates a compact stack of seven layers as shown in Fig. 6 ready for transfer into a bag or carrier D.

The shifting of the entire stack of containers from the support G into a bag or carrier D is effected by the auxiliary pusher K which is located adjacent the path of travel of the support G. The bag or carrier D is held in open position adjacent the stack by any suitable device such as that disclosed in United States Patent 2,608,331, issued August 26, 1952, to E. Hoffman on Bag Opening Machine with upper and lower bag forming units.

The auxiliary pusher K is carried on one end of a piston rod 81 (Fig. 4) having a piston 82 which operates in a closed cylinder 83 carried on the machine frame 15 (see Figs. 1 and 3). The piston 82 is periodically reciprocated in the cylinder 83 in time with the final downward movement of the support G, by fluid pressure preferably effected by compressed air introduced into the cylinder by way of inlet pipes 84, 85 which communicate with the interior of the cylinder adjacent its ends. Control of the air is effected by a slide valve 86 disposed in a bore 87 of a valve housing 88. The inlet pipes 84, 85 lead from this housing with the pipes in communication with the valve bore 87. Opposite the ends of the inlet pipes 84, 85, the bore 87 communicates with a supply pipe 89 which leads from any suitable supply of air under pressure.

The slide valve 86 adjacent its ends is provided with vents 91, 92 for venting the cylinder 83. Intermediate its ends the valve is formed with a groove 93 which in width is slightly less then the distance between the ends of the inlet pipes 84, 85 in the bore 87. The ends of the slide valve 86 project beyond the ends of the housing 88. At one end, the right as viewed in Fig. 4, a compression spring 94 surrounds the valve, between the housing 88 and a head 95 on the valve and yieldably holds the valve in its normal position as shown in Fig. 4. In this position the inlet pipe 85 is cut off from the supply pipe 89 and the inlet pipe 84 is in communication with the supply pipe. This connection introduces air into the front end of the cylinder 83 and exerts a pressure against the piston 82 to keep the pusher K in a normal retracted position as shown in Figs. 4, 5 and 6, the back end of the cylinder being vented through the vent 91 and inlet pipe 85.

The end of the slide valve 86 opposite the compression spring 94 is surrounded with a normally de-energized electric solenoid 96 which is connected by wires 97, 98 to the generator 43 and to a normally open electric switch 99 having a wire 100 connecting with the generator 43 thus comprising a normally open electric circuit N. This circuit is periodically closed in time with the final downward movement of the support G by a cam lug 102 (Figs. 2 and 3) formed on the periphery of the barrel cam 68.

The cam lug 102 is so located on the barrel cam 68 in relation to the cam groove 67 that when the support G reaches the bottom of its down travel and the containers A in the stack are leveled as shown in Fig. 6, the lug 102 engages the movable element of the switch 99 and closes the switch. Closing of the switch closes the circuit N and thus energizes the solenoid 96 with the result that the slide valve 86 is shifted toward the left as viewed in Fig. 4.

This shifting of the slide valve 86 cuts off air from the inlet pipe 84 and vents the front end of the cylinder 83. At the same time the inlet pipe 85 is brought into communication with the supply pipe 89 and compressed air is thus introduced into the back end of the cylinder. This compressed air forces the piston 82 and the auxiliary pusher K outwardly and thus pushes the entire stack of containers A from the support G into the bag or carrier D as shown in Fig. 7. Upon completing its stroke the auxiliary pusher K moves back into its normal retracted position. This is effected by the cam lug 102 rotating out of the zone of the switch 99, thereby permitting the switch to open and break the circuit N. This de-energizes the solenoid 96 and allows the compression spring 94 to draw the slide valve 86 back into its normal position and thus reestablish communication between the inlet pipe 84 and the supply pipe 89 to introduce compressed air into the front of the cylinder and thus retract the auxiliary pusher K.

During this operation of pushing the stack into the bag or carrier D, the container pusher F remains idle by reason of the cam portion 58 of the edge cam 51 holding the switch 44 of circuit M open. This holds the solenoid 42 de-energized and thus holds the pusher F inoperative until the start of a new cycle of operation. As soon as the auxiliary pusher K has reached its retracted position, the groove 67 of the barrel cam 68 raises the support G into its original elevated position as shown in Fig. 4 with the top face of the fixed platform H slightly below the level of the upper run of the belt conveyor B to start a new cycle and receive containers for a new stack.

During this up travel of the support G, the movable platforms H move away from the leveling pins 78 and thus return to their tilted positions for the reception of containers for a new stack. This completes the cycle of operation of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for stacking articles in layers for packaging, the combination of a support, means for advancing toward said support parallel rows of articles to produce a unit layer thereon, means for lowering said support step-by-step as unit layers of articles are formed thereon to build up a stack of a plurality of layers, and a plurality of movable platforms mounted on said support in parallel rows and having supporting faces for receiving and supporting the rows of articles of the initial unit layer of said stack, the supporting faces of said platforms being arranged in stepped relation to facilitate sliding of said rows of articles from one platform to the next without interference to form said initial unit layer of articles and to facilitate sliding of the rows of articles of subsequent unit layers over each other without interference to build up said stack of articles.

2. In a machine for stacking articles in layers for packaging, the combination of a support, means for advancing toward said support parallel rows of articles to produce a unit layer thereon, means for lowering said support step-by-step as unit layers of articles are formed thereon to build up a stack of a plurality of layers, a plurality of movable platforms mounted on said support in parallel rows and having supporting faces for receiving and supporting the rows of articles of the initial unit layer of said stack, the supporting faces of said platforms being arranged in stepped relation to facilitate sliding of said rows of articles from one platform to the next without interference to form said initial unit layer of articles and to facilitate sliding of the rows of articles of subsequent unit layers over each other without interference to build up said stack of articles, and means for moving said platforms to align their supporting faces in a common plane to align said articles in the stack.

3. In a machine for stacking articles in layers for packaging, the combination of a support, means for advancing toward said support parallel rows of articles to produce a unit layer thereon, means for lowering said support step-by-step as unit layers of articles are formed thereon to build up a stack of a plurality of layers, a plurality of movable platforms mounted on said support in parallel rows and having supporting faces for receiving and supporting the rows of articles of the initial unit layer of said stack, the supporting faces of said platforms being arranged in stepped relation to facilitate sliding of said rows of articles from one platform to the next without interference to form said initial unit layer of articles and to facilitate sliding of the rows of articles of subsequent unit layers over each other without interference to build up said stack of articles, and stationary members disposed in the path of travel of said support and engageable with said platforms for moving said platforms to align their supporting faces in a common plane to align said articles in the stack.

4. In a machine for stacking articles in layers for packaging, the combination of a support, means for advancing toward said support parallel rows of articles to produce a unit layer thereon, means for lowering said support step-by-step as unit layers of articles are formed thereon to build up a stack of a plurality of layers, and a plurality of platforms mounted on said support in parallel rows extending transversely of the path of travel of the rows of articles advanced toward said support, said platforms having flat supporting faces for separately receiving and supporting one row of said articles of the initial unit layer of said stack, the supporting faces of said platforms being tilted in an inclined position for engagement by the leading ends of advancing row of articles to facilitate sliding of said rows of articles from one platform to the next without interference to form said initial unit layer of articles and to facilitate sliding of the rows of articles of subsequent unit layers over each other without interference to build up said stack of articles.

5. In a machine for stacking articles in layers for packaging, the combination of a support, means for advancing toward said support parallel rows of articles to produce a unit layer thereon, means for lowering said support step-by-step as unit layers of articles are formed thereon to build up a stack of a plurality of layers, a plurality of platforms pivotally mounted on said support in parallel rows extending transversely of the path of travel of the rows of articles advanced toward said support, said platforms having flat supporting faces for separately receiving and supporting one row of said articles of the initial unit layer of said stack, the supporting faces of said platforms being tilted in an inclined position for engagement by the leading ends of an advancing row of articles to facilitate sliding of said rows of articles from one platform to the next without interference to form said initial unit layer of articles and to facilitate sliding of the rows of articles of subsequent unit layers over each other without interference to build up said stack of articles, and means disposed in the path of travel of said support for hinging said supporting faces of said platforms into aligned relation in a common plane to align said articles in the stack.

6. In a machine for stacking rectangular articles in layers for packaging, the combination of a conveyor for feeding articles, a support disposed adjacent said conveyor, pusher means for transferring rows of articles from said conveyor toward said support to produce a unit layer thereon, means for lowering said support step-by-step as unit layers of articles are formed thereon to build up a stack of a plurality of layers, means for synchronizing the operation of said pusher means and said support lowering means, and a plurality of movable platforms mounted on said support in parallel rows and having supporting faces for receiving and supporting the rows of articles of the initial unit layer of said stack, the supporting faces of said platforms being arranged in stepped relation to facilitate sliding of said rows of articles from one platform to the next without interference to form said initial unit layer of articles and to facilitate sliding of the rows of articles of subsequent unit layers over each other without interference to build up said stack of articles.

7. In a machine for stacking articles in layers for packaging, the combination of a support, means for advancing toward said support parallel rows of articles to produce a unit layer thereon, means for lowering said support step-by-step as unit layers of articles are formed thereon to build up a stack of a plurality of layers, a horizontal platform fixed on said support adjacent said advancing means and a plurality of platforms pivotally mounted on said support immediately adjacent said fixed platform, said fixed and pivotally mounted platforms being disposed in parallel rows extending transversely of the path of travel of the rows of articles advanced toward said support, said platforms having flat supporting faces for separately receiving and supporting one row of said articles of the initial unit layer of said stack, the supporting faces of said pivotally mounted platforms being tilted in an inclined position for engagement by the leading ends of an advancing row of articles to facilitate sliding of said rows of articles from one platform to the next without interference to form said initial unit layer of articles and to facilitate sliding of the rows of articles of subsequent unit layers over each other without interference to build up said stack of articles, and means disposed in the path of travel of said support for hinging said supporting faces of said pivotally mounted platforms into aligned relation in a common plane with the supporting face of said fixed horizontal platform to align said articles in the stack.

References Cited in the file of this patent

UNITED STATES PATENTS 2,556,188  Jakob ---------------- June 12, 1951